(12) United States Patent
Laurösch et al.

(10) Patent No.: US 7,405,357 B2
(45) Date of Patent: Jul. 29, 2008

(54) FRAME SECTION

(76) Inventors: Sven Laurösch, AM Roβach 5, 35708 Haiger (DE); Ralf Dahmer, Brabeckstr. 6, 57462 Olpe (DE); Jörg Kreiling, Grabenstr. 9, 35444 Biebertal (DE); Marc Hartel, Frhr.-v-Stein-Str. 15, 35447 Reiskirchen (DE)

( * ) Notice: Subject to any disclaimer, the term of this patent is extended or adjusted under 35 U.S.C. 154(b) by 808 days.

(21) Appl. No.: 10/498,156

(22) PCT Filed: Dec. 6, 2002

(86) PCT No.: PCT/EP02/13817

§ 371 (c)(1),
(2), (4) Date: Jun. 8, 2004

(87) PCT Pub. No.: WO03/053192

PCT Pub. Date: Jul. 3, 2003

(65) Prior Publication Data

US 2005/0082239 A1    Apr. 21, 2005

(30) Foreign Application Priority Data

Dec. 8, 2001 (DE) ............................ 101 60 418
Mar. 11, 2002 (DE) ........................... 202 03 885 U

(51) Int. Cl.
*H02G 3/04* (2006.01)
*A47F 7/00* (2006.01)

(52) U.S. Cl. ............... 174/68.1; 174/100; 174/72 B; 174/71 B; 211/26; 211/189; 211/182; 312/265.4

(58) Field of Classification Search ............... 174/480, 174/481, 492, 68.1, 68.3, 72 B, 71 B, 88 B, 174/70 B, 99 B, 100; 211/26, 186, 189; 52/220.1, 52/220.3, 220.5, 220.7, 239, 653.1, 653.2; 361/600, 601, 796, 724, 725, 824, 265, 827; 312/265.1, 265.2, 265.3, 265.6; 439/115
See application file for complete search history.

(56) References Cited

U.S. PATENT DOCUMENTS

| 3,909,502 A | * | 9/1975 | Lacan ................... 174/100 |
| 4,795,355 A | | 1/1989 | Dorn et al. |
| 5,072,343 A | | 12/1991 | Buers |
| 5,670,743 A | * | 9/1997 | Welch et al. ............. 52/220.7 |
| 6,019,446 A | * | 2/2000 | Laboch et al. ........... 312/265.1 |
| 6,296,498 B1 | * | 10/2001 | Ross ...................... 439/115 |

(Continued)

FOREIGN PATENT DOCUMENTS

DE          29 15 502       4/1979

(Continued)

*Primary Examiner*—Angel R Estrada
(74) *Attorney, Agent, or Firm*—Jansson Shupe & Munger Ltd.

(57) ABSTRACT

The invention relates to a frame section (10) for a framework (1) of a rack, switchgear cabinet, or table system (30) and to a framework, switchgear cabinet, or table system comprising a frame section of this type. The section provides a wide range of mounting options with a simple construction by consisting of a support section and a conduit (20) housed therein, with several busbars (21) that are embedded in insulation (22) in the conduit and which run in the longitudinal direction of the support section and are accessible from a longitudinal side of the frame

15 Claims, 4 Drawing Sheets

U.S. PATENT DOCUMENTS

| | | | |
|---|---|---|---|
| 6,428,127 B1 | 8/2002 | Rasmussen | |
| 6,951,085 B2 * | 10/2005 | Hodges et al. | 52/220.7 |
| 7,049,514 B2 * | 5/2006 | Brandt et al. | 174/72 B |
| 7,256,346 B2 * | 8/2007 | Walter | 174/68.1 |

FOREIGN PATENT DOCUMENTS

| | | |
|---|---|---|
| DE | 33 44 598 | 12/1983 |
| DE | 37 06 797 | 3/1987 |
| DE | 40 13 370 | 4/1990 |
| DE | 44 39 551 | 11/1994 |
| DE | 196 47 814 | 11/1996 |
| EP | 0 980 120 | 8/1999 |

* cited by examiner

FRAME SECTION

FIELD OF THE INVENTION

The present invention relates to a frame section for a framework of a rack, switchgear cabinet, table, or table arrangement and to a framework, switchgear cabinet, table, or table arrangement comprising a frame section of this type.

BACKGROUND OF THE INVENTION

A frame section of this type is designed for constructing a framework for a rack, switchgear cabinet, or table arrangement, especially as open or closed hollow structures having supporting structures or attachments for achieving the required bearing capacity. Such frameworks are disposed with openings and/or struts in order to provide a plurality of mounting possibilities within the interior of the switchgear cabinet and also in order to attain the necessary sealing for a switchgear cabinet against outside climatic conditions or electromagnetic interference. Frame sections can be coupled together in a framework assembly configured from these sections. A frame section of this type and the framework assembly configured therefrom is known from DE 33 44 598 A1, DE 44 39 551 A1 and DE 196 47 814 A1. Such a framework, switchgear cabinet, or table arrangement often supports different types of electrical devices such as devices for information technology. In such cases, conduits are positioned above the framework and the switchgear cabinet and cables are guided or—particularly with higher requirements of electric current—electrical current distributing busbars are supported, by means of appropriate retaining elements.

It is the intention of certain embodiments of the present invention to provide a frame section as well as a framework which allows improved mounting options with reduced assembly effort.

OBJECTS OF THE INVENTION

It is an object of the invention to provide a frame section for a framework which overcomes some of the problems and shortcomings of the prior art.

Another object of the invention is to provide a frame section for a framework which offers increased contacting options.

Another object of the invention is to provide a frame section for a framework which includes busbars disposed so as to protect against contact.

Another object of the invention is to provide a frame section for a framework which provides a free space for accessories at a corner region on the exterior of the framework.

Yet another object of the invention is to provide a frame section for a framework which includes a plurality of busbars accessible from the interior side of the framework.

How these and other objects are accomplished will become apparent from the following descriptions and the drawings.

SUMMARY OF THE INVENTION

In certain embodiments, the invention is a frame section for use in a framework having an interior and an exterior. The frame section comprises a support section including a conduit extending in a longitudinal direction, the conduit being at least partially open along a longitudinal side, the at least partially open longitudinal side facing the interior of the framework; a plurality of busbars embedded in insulation, the plurality of busbars and the insulation extending in the longitudinal direction and accessible from the longitudinal side; and an angularly-profiled wall section adjacent the support section to form a free space for accessories at a corner region on the exterior of the framework away from the longitudinal side.

In certain embodiments, the insulation includes at least one insulation section at least partially open over the busbar on the longitudinal side. The insulation may include longitudinal grooves into which the plurality of busbars are inserted. The insulation section may have a rectangular cross-section.

In certain embodiments, the conduit has a substantially rectangular or square cross-section and the insulation is comprised of two segments arranged on the two lateral walls aligned perpendicular to the longitudinal side, each segment supporting at least one busbar. In such embodiments, each busbar is preferably positioned facing another busbar across the conduit. The conduit may be defined by base struts with each base strut including limiting struts positioned perpendicular thereto, i.e., extending into the conduit, such that each base strut forms a partial cavity to receive a respective insulation segment.

In certain embodiments, the frame section includes at least one grounding rail within the conduit.

The invention may also be described as a frame section for use in a framework having an interior and an exterior. In such embodiments, the frame section comprises a conduit extending in a longitudinal direction, the conduit defined by parallel lateral walls extending in the longitudinal direction, the conduit being at least partially open along a longitudinal side between the parallel walls, the at least partially open longitudinal side facing the interior of the framework; a plurality of busbars embedded in insulation, the plurality of busbars and the insulation extending in the longitudinal direction and accessible from the longitudinal side; and an angularly-profiled wall section adjacent one of the lateral walls, the angularly-profiled wall section forming a free space for accessories at a corner region on the exterior of the framework away from the longitudinal side.

The angularly-profiled wall section and the adjacent lateral wall preferably form transverse planes which preferably intersect at about 45°.

In certain embodiments, the insulation includes at least one insulation section at least partially open over the busbar on the longitudinal side. The insulation may include longitudinal grooves into which the plurality of busbars are inserted. The insulation may includes two segments with each segment arranged on one of the lateral walls and supporting at least one busbar. Such a frame section may further comprise at least one grounding rail within the conduit.

In certain embodiments, the invention is a framework comprising at least one frame leg configured as a frame section comprising a support section including a conduit extending in a longitudinal direction, the conduit being at least partially open along a longitudinal side, the at least partially open longitudinal side facing the interior of the framework; a plurality of busbars embedded in insulation, the plurality of busbars and the insulation extending in the longitudinal direction and accessible from the longitudinal side; and an angularly-profiled wall section adjacent the support section to form a free space for accessories at a corner region on the exterior of the framework away from the longitudinal side.

In certain embodiments, the framework further comprises insertable adapters fixable to the conduit to provide electrical contact with devices. Two adapters may be connected to one another to render a module adapter arrangement. The conduit may be connected to a current supply by a connector element or by an adapter.

In certain embodiments, the framework further comprises vertical and horizontal frame legs configured as frame sections with the conduits of the vertical and horizontal frame legs being in electrical contact with one another.

In certain embodiments, the invention provides for the frame section being comprised of a support section and a conduit housed in the section with a plurality of busbars running in longitudinal direction of the support section, embedded in insulation and accessible from one longitudinal side. Thus, the frame section, in addition to being used for load-bearing, is utilized for supporting and conducting of simple and precise electrification. The frame section allows explicit connection possibilities and simple data transmission options.

By positioning the insulation and the busbars in an at least partially open receiving cavity on a longitudinal side of the section, the frame section can be readily configured to protect against accidental contact while providing space-saving and secure housing.

Certain embodiments of the invention provide a simple frame section construction into which the conduit can be introduced since the insulation is configured to have at least one insulation section at least partially open over the busbars on the longitudinal side.

Certain embodiments of the invention provide longitudinal grooves in the insulation into which the busbars are inserted to facilitate contacting options and to protect the busbars against contact.

In certain embodiments, the insulation section has a rectangular cross-section to facilitate manipulation and simple construction.

In certain embodiments, the receiving cavity has a basic cross-section of rectangular or square shape and the insulation is comprised of two segments arranged on the two lateral walls perpendicular to the open side of the receiving cavity with each segment supporting at least one busbar. In such an embodiment, the busbars of the two segments are each arranged in opposing facing position on a plane parallel to the open side to facilitate connections.

In certain embodiments, partial cavities are configured from segments of the base strut formed from a respective lateral wall and limiting struts provided perpendicular thereto. Such partial cavities allow insertion of the insulation sections on the two lateral walls, or the two insulation sections may be attached to retaining struts extending from the two lateral walls.

In certain embodiments, to extend the functionality of the frame section it is disposed with at least one row of mounting holes, at least one longitudinal mounting groove and/or at least one mounting strut on at least one of the section sides disposed parallel or at right angles adjacent the open side of the receiving cavity. In a constructed framework, switchgear cabinet, table arrangement, or table, the mounting holes, longitudinal grooves, and/or mounting struts are arranged on the inward facing side of the framework or switchgear cabinet and offer facilitated mounting options with easy access to the electrifying system.

The range of application of the frame section, in particular for a switchgear cabinet, reflects a further advantageous embodiment in that a free space is formed at a corner region away from the open side by means of an angularly-profiled wall section and/or sealing edging extending perpendicular to the exterior.

For precautions upon electrification, another advantageous embodiment is characterized in that at least one grounding rail is provided within the opened clearance range of the receiving cavity.

The retrofitting or connection possibilities for a framework are extended by providing the framework with at least one frame leg configured as a frame section. An advantageous embodiment thereby provides at least one vertical section configured as such a frame section. The receiving cavity is advantageously situated at the inward facing side of the framework.

In certain embodiments, connecting equipment or other electrical devices such as IT equipment to the conduit is facilitated by providing insertable adapters which can be fixed to the conduit for contacting purposes in the receiving cavity. Two adapters may be coupled to one another in a module adapter arrangement, to allow the conduit to be made available in a neighboring cabinet, framework, or table arrangement, such that connection to the current supply is only necessary by one framework.

Various advantageous options for connecting the conduit to the current supply are given in that the conduit is introduced via the front face side of the frame section or is connected or connectable to a current supply by means of an adapter.

Additionally or alternatively, at least one horizontal frame section can be provided with a conduit of the cited type. Simple coupling elements can be utilized between vertical and horizontal frame sections for the electrical coupling.

DETAILED DESCRIPTION OF PREFERRED EMBODIMENTS

Figure 1:
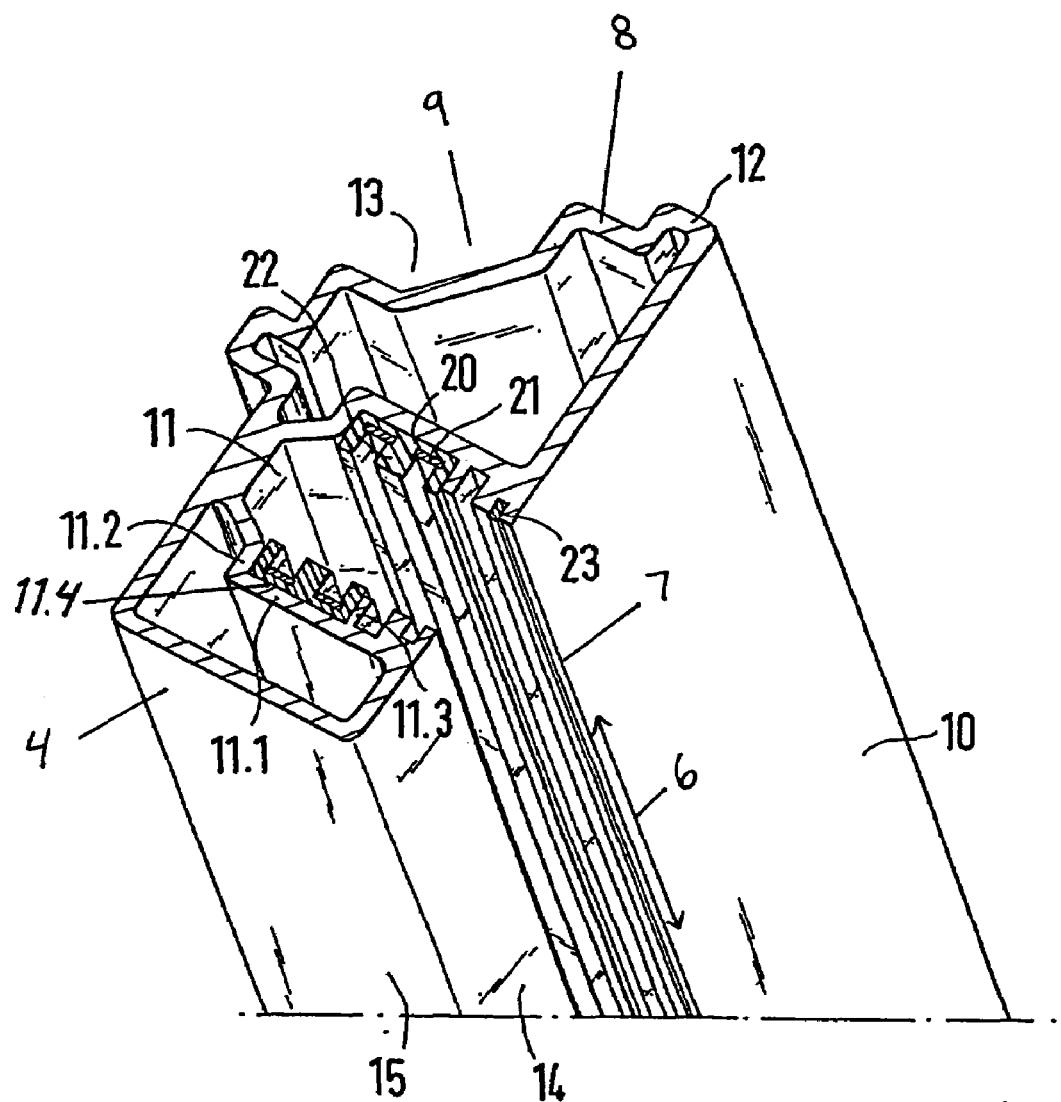
FIG. 1 is a perspective view of a segment of a frame section provided with a conduit in accordance with the principles of the present invention.
Figure 2:
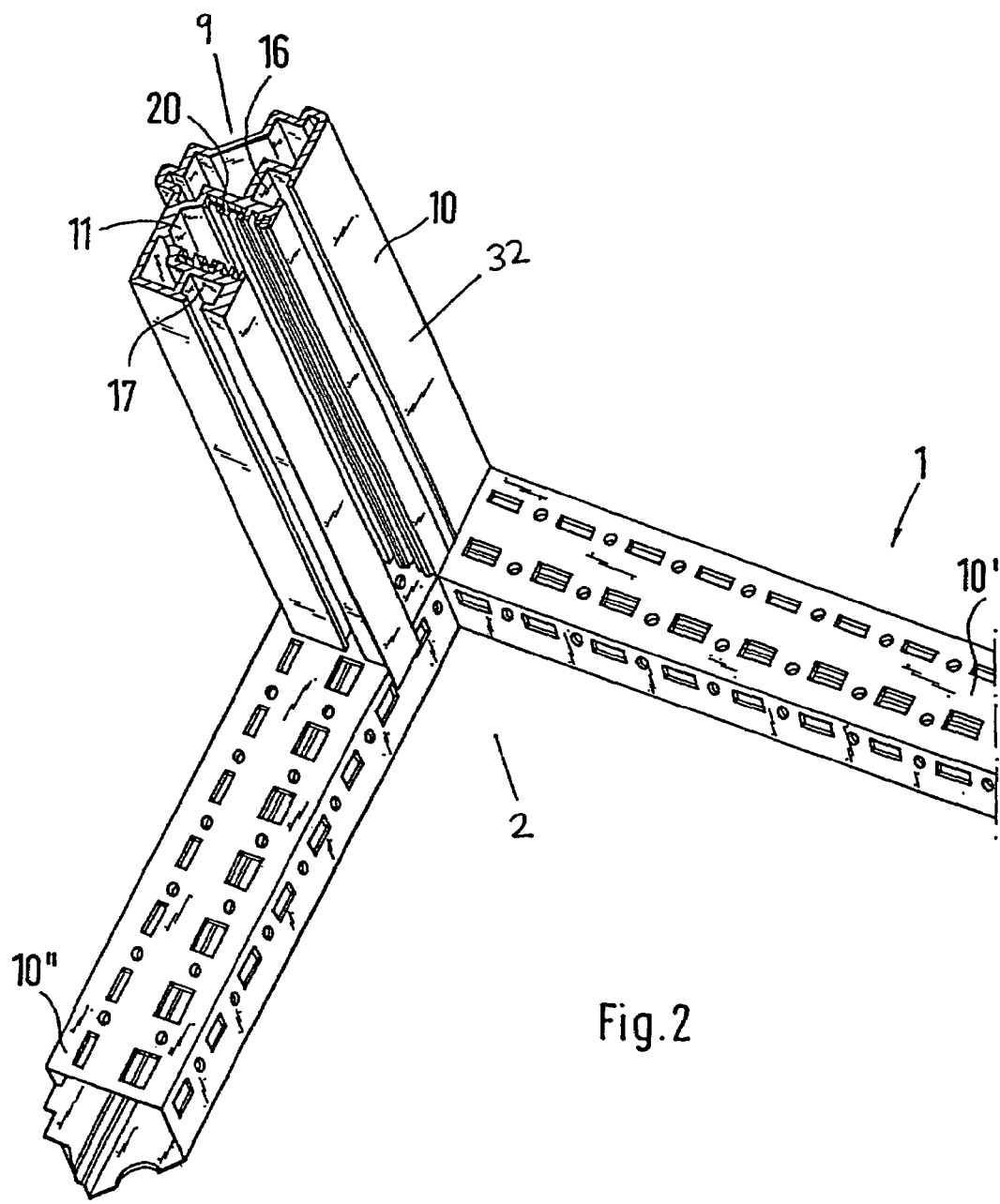
FIG. 2 is a cutaway view of a framework in the area of a corner, whereby a vertical frame leg is configured as a frame section provided with a conduit in accordance with the principles of the present invention.
Figure 3:
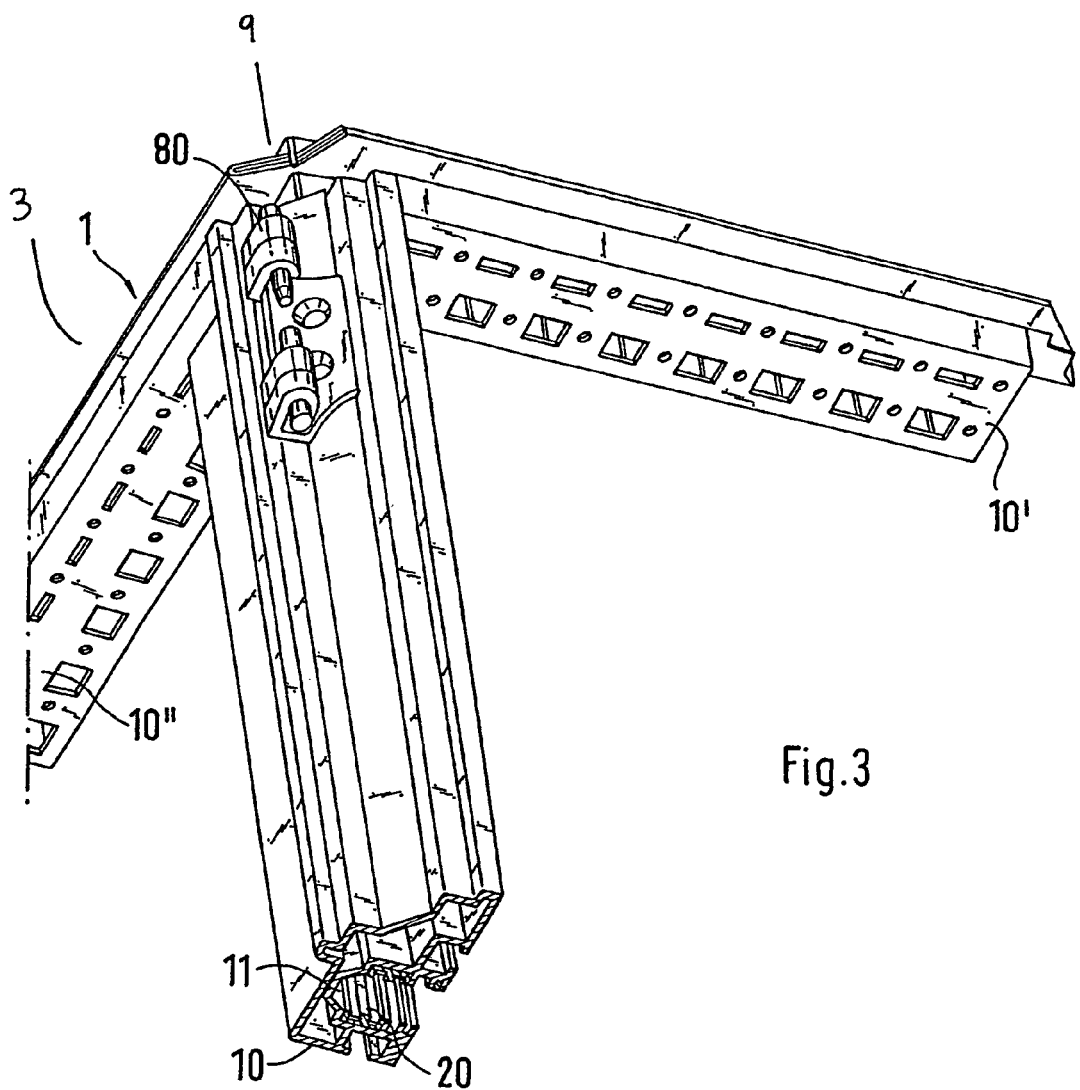
FIG. 3 is a further cutaway view of a framework in a corner area in which a vertical frame leg is configured as a frame section provided with a conduit in accordance with the principles of the present invention.
Figure 4:
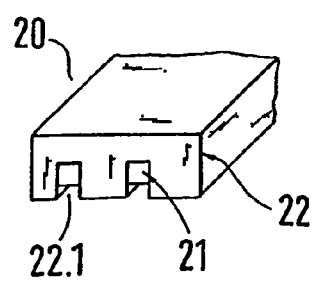
FIG. 4 shows an insulation section inserted into a frame section according to FIG. 1 in sectional perspective view in accordance with the principles of the present invention.

Frame section 10 shown in FIG. 1 is configured as a multi-chambered section including a support section 4 and a wall section 8 to facilitate construction of a framework 1. Sealing edging 12 is provided at right angles to the exterior 3 of framework 1. A free space 13 is formed from an angularly-profiled section wall at a corner region 9 along an outer edge. A receiving cavity 11 is provided open to the inwardly facing side 14 of the framework 1 once constructed (see. FIGS. 2 and 3). Conduit 20 is disposed in receiving cavity 11 with busbars 21 embedded in opposing facing insulation sections 22, all extending in a longitudinal direction noted by numeral 6 and accessible along a longitudinal side 14 through opening 7.

Receiving space 11, accessible from open side 14, exhibits a relatively rectangular or square cross-section, an is preferably formed with a enlarged area or bulge on the side opposite open side 14. The lateral walls 11.1 perpendicular to open side 14 are configured as partial receiving cavities 11.4 for the two insulation sections 22, whereby each lateral wall section 11.1 forms a base strut with a lateral restriction to the partial cavity provided thereon at right inward angles by limiting struts 11.2, 11.3.

Insulation sections 22 are positioned in the partial receivers, e.g., inserted during the manufacturing process or subsequently, and exhibit an essentially rectangular cross-section. Insulation 22 includes longitudinally-extending grooves into which barlike busbars 21, shown having rectangular cross-sections, are introduced on the insulation's inner facing sides. Busbars 21 are thereby situated deep in longitudinal grooves 22.1 of insulation section 22 such that the lateral groove walls protrude far enough outward so as to ensure protection is provided against any accidental further contact with the busbars 21. The longitudinal opening 7 disposed at first interior section side 11, corresponding to open side 7 of section 4, is provided with a grounding rail 23 in the form of a copper band on at least one side of the facing edges so as to provide a simple grounding terminal.

Frame section 10 is advantageously utilized as at least one vertical frame leg 32 of framework 1 with suitable corner connections by simply screwing or otherwise connecting leg 32 to a top and bottom frame formed by horizontal frame legs 10', 10" at the width and depth as shown in FIGS. 2 and 3. In frame section 10 shown in FIGS. 2 and 3 with conduit 20, longitudinally extending T-grooves 16 are provided for affixing mountings or transverse struts at the two inner section sides 14, 15 disposed at a right angle to one another and abutting receiving cavity 11. For example, screw strips with a row of drill holes can be disposed in T-grooves 16, 17 to provide for mounting. Alternatively, frame section 10 can also be provided with rows of mounting holes similar to the rows of mounting holes provided in the two horizontal frame legs 10', 10".

Figure 5:
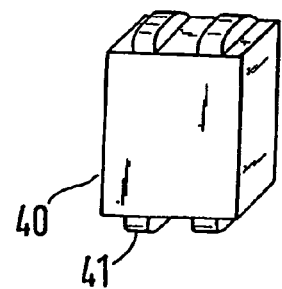
FIG. 5 shows an adapter to connect to a conduit according to FIGS. 1-3 in accordance with the principles of the present invention.

The electrical devices fitted as desired into the framework, such as, for example, control units or servers, can be easily connected to adapter 40 shown in FIG. 5. Adaptor 40 is fitted to be inserted into conduit 20 to provide electrical contact with busbar 21. Block-shaped adapter 40 is shown configured for introduction to conduit 20 in longitudinal orientation to the opening 7 of receiving cavity 11 and thereafter comes into contact with busbar 21 upon a 90° rotation. Contacts 41 of adapter 40 can also be spring-mounted, for example, in order to generate the necessary contacting force with busbars 21. Longitudinal grooves 22.1 of the two-sided partial insulation sections 22 are situated in a plane parallel to the open side 14. A pair of busbars 21 may provide a conventional direct voltage and another pair of busbars 21 may provide an alternating voltage or another direct voltage or serve as a line for data transmission. The connection of conduit 20 to a supply voltage can likewise transpire via a suitable adapter 40 or from the lower or upper face side. When joining frameworks together, adapters 40 in adjacent frame sections 10 can be connected in series so that only one connection to a voltage supply is necessary.

If desired, alternatively or additionally, at least one horizontal frame leg 10', 10" of a frame section 10 can be configured with a conduit 20. A conduit 20 can also be provided in the manner described on a lateral wall of a switchgear cabinet via a canted frame leg.

Since at least the vertical frame leg is disposed with a free space 13 at its exterior 3, accessories 80 such as hinges or locking elements or side panels can be readily connected thereto, with their canting extending into free space 13 and with their inner side tightly abutting sealing edging 12.

Figure 6:
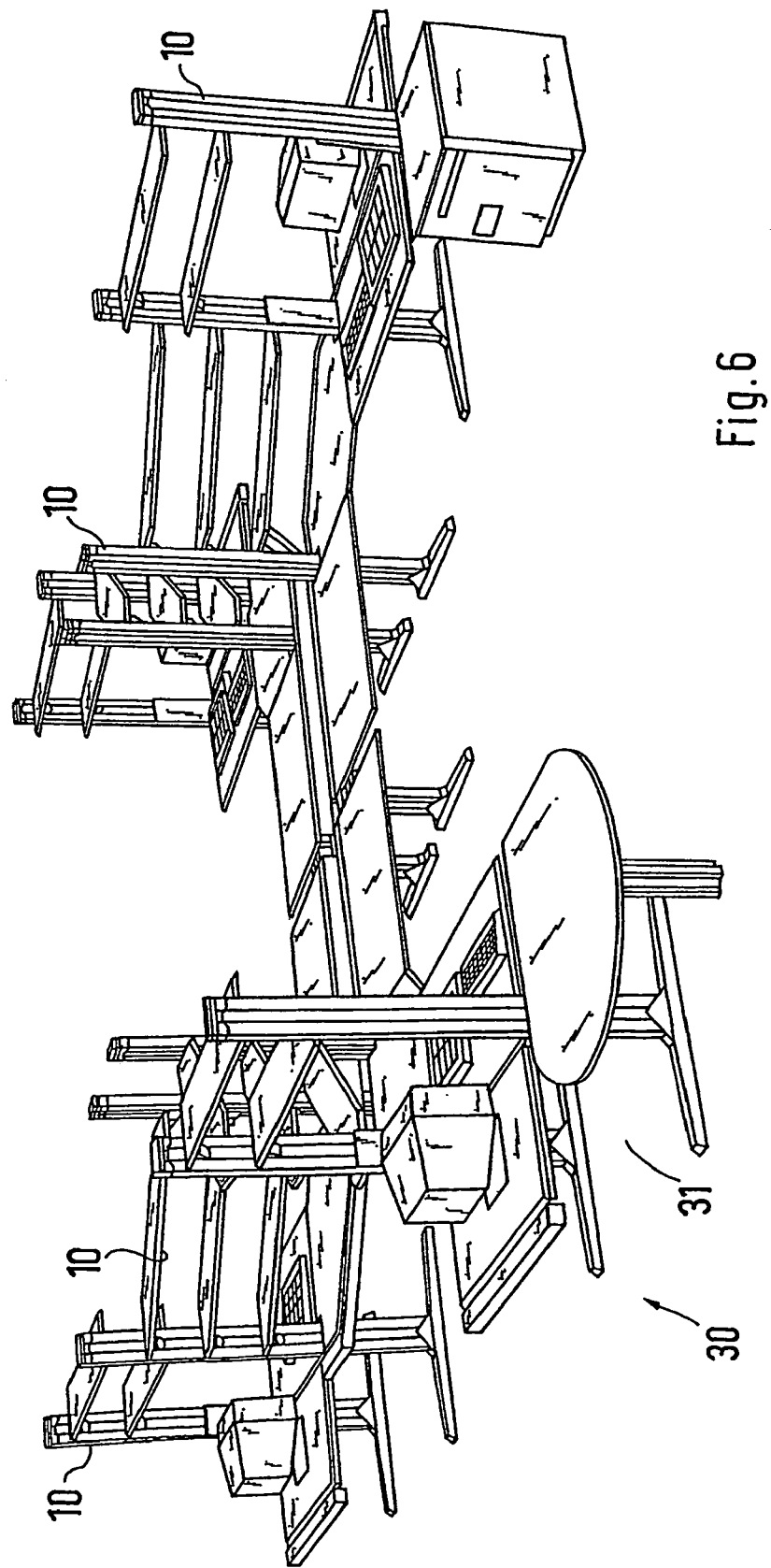
FIG. 6 shows a table arrangement with vertical and horizontal frame sections provided with conduits in accordance with the principles of the present invention.

FIG. 6 shows a table arrangement or system 30 having tables 31 with vertical frame legs configured as supporting pillars extending to the height of the table tops or even higher and which can be provided with additional storage shelf racks. The vertical frame legs are preferably arranged at the ends of the table tops, are configured at least partially from frame sections with conduits 20 accessible from the interior 2 and are preferably configured to be essentially flat at least on their inward opposing facing sides. In addition to the longitudinally extending access openings 7 to the respective conduits 20, a number of rows of fixing cavities are preferably arranged in longitudinal direction for attaching horizontal frame legs, e.g., via hooks and/or bolted connections. In addition, horizontal frame legs can also be outfitted as frame sections with conduits 20 of the type specified above. An electrical coupling between conduits 20 of the vertical and the horizontal frame legs can be made by means of adapted coupling elements provided with contacting means on their sides situated at right angles to one another. It will suffice to make the connection to a supply at only one vertical or horizontal frame leg from which the current can then be transmitted on to other frame legs by means of coupling elements 40.

Correspondingly encompassed in particular by the terms framework, rack, switchgear cabinet, table 31 and table arrangement 30 cited in the present embodiments are also such arrangements or combinations thereof for information technology (IT) including rack superstructures or shelves for monitors or server cabinets or the like.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A frame section for use in a framework having an interior and an exterior, the frame section comprising:
   a support section including a cavity extending in a longitudinal direction, the cavity being at least partially open along an interior longitudinal side, the longitudinal side facing the interior of the framework;
   a plurality of busbars embedded in insulation, the insulation comprising a plurality of longitudinal grooves having the plurality of busbars fully recessed therein, each groove being open to the cavity outward from the busbar therein such that one side of the busbar is fully uninsulated and in direct communication with the cavity, the plurality of busbars and the insulation being disposed within the cavity, extending in the longitudinal direction and accessible from the longitudinal side; and
   an exterior angularly-profiled wall section spaced apart from the support section, the wall section defining a fully open, recessed space for accessories at a corner region of the frame section spaced away from the longitudinal side and facing the exterior of the framework, a portion of the wall section being in a plane that intersects a plane along the longitudinal side at about 45°.

2. The frame section of claim 1 wherein the insulation has a rectangular cross-section.

3. The frame section of claim 2 wherein the cavity has a substantially rectangular or square cross-section partially defined by two lateral walls aligned perpendicular to the longitudinal side and the insulation is comprised of two segments, each segment being arranged on a respective lateral wall, each segment supporting at least one busbar.

4. The frame section of claim 3 wherein each busbar is positioned facing another busbar across the cavity.

5. The frame section of claim 3 wherein each lateral wall includes limiting struts positioned perpendicular thereto such that each lateral wall forms a partial cavity to receive a respective insulation segment.

6. The frame section of claim 1 further comprising at least one grounding rail mounted within the cavity and spaced apart from the insulation.

7. The frame section of claim 1 wherein each busbar is bar-like and has a rectangular cross-section.

8. A frame section for use in a framework having an interior and an exterior, the frame section comprising:
- a cavity extending in a longitudinal direction, the cavity defined by parallel lateral walls extending in the longitudinal direction, the cavity being at least partially open along an interior longitudinal side between the lateral walls, the at least partially open longitudinal side facing the interior of the framework;
- a conduit comprising a plurality of busbars embedded in insulation, the insulation comprising a plurality of longitudinal grooves having the plurality of busbars fully recessed therein, each groove being open to the cavity outward from the busbar therein such that one side of the busbar is fully uninsulated and in direct communication with the cavity, the conduit being positioned in the cavity, extending in the longitudinal direction, and accessible from the longitudinal side; and
- an exterior angularly-profiled wall section spaced apart from one of the lateral walls, the angularly-profiled wall section forming a fully open, recessed space for accessories at a corner region of the frame section spaced away from the longitudinal side and facing the exterior of the framework, a portion of the wall section being in a plane that intersects a plane alone the longitudinal side at about 45°.

9. The frame section of claim 8 wherein the insulation is comprised of two segments, each segment arranged on one of the lateral walls and supporting at least one busbar.

10. The frame section of claim 8 further comprising at least one grounding rail mounted within the cavity and spaced apart from the insulation.

11. A framework comprising at least one frame leg configured as a frame section comprising:
- a support section including a cavity extending in a longitudinal direction, the cavity being at least partially open along an interior longitudinal side, the longitudinal side facing the interior of the framework;
- a conduit comprising a plurality of busbars embedded in insulation, the insulation comprising a plurality of longitudinal grooves having the plurality of busbars fully recessed therein, each groove being open to the cavity outward from the busbar therein such that one side of the busbar is fully uninsulated and in direct communication with the cavity, the conduit being disposed within the cavity, extending in the longitudinal direction and accessible from the longitudinal side; and
- an exterior angularly-profiled wall section spaced apart from the support section, the wall section defining a fully open, recessed for accessories at a corner region of the frame section spaced away from the longitudinal side and facing the exterior of the framework, a portion of the wall section being in a plane that intersects a plane along the longitudinal side at about 45°.

12. The framework of claim 11 further comprising insertable adapters fixable to the conduit to provide electrical contact with devices.

13. The framework of claim 12 wherein two adapters are connected to one another to render a module adapter arrangement.

14. The framework of claim 12 wherein the conduit is connected to a current supply by a connector element or by an adapter.

15. The framework of claim 11 further comprising vertical and horizontal frame legs configured as frame sections, the conduits of the vertical and horizontal frame legs being in electrical contact with one another.

* * * * *

UNITED STATES PATENT AND TRADEMARK OFFICE
CERTIFICATE OF CORRECTION

PATENT NO. : 7,405,357 B2
APPLICATION NO. : 10/498156
DATED : July 29, 2008
INVENTOR(S) : Sven Laurösch et al.

It is certified that error appears in the above-identified patent and that said Letters Patent is hereby corrected as shown below:

Column 5, line 17, after "side", delete "11" and insert --14--.
Column 8, line 21, after "recessed", insert --space--.

Signed and Sealed this

Eleventh Day of November, 2008

JON W. DUDAS
*Director of the United States Patent and Trademark Office*